Figure 6:

P. S. H. NEWELL.
BOOK.
APPLICATION FILED APR. 17, 1909.
1,028,130.
Patented June 4, 1912.
4 SHEETS—SHEET 1.
Fig. 1,
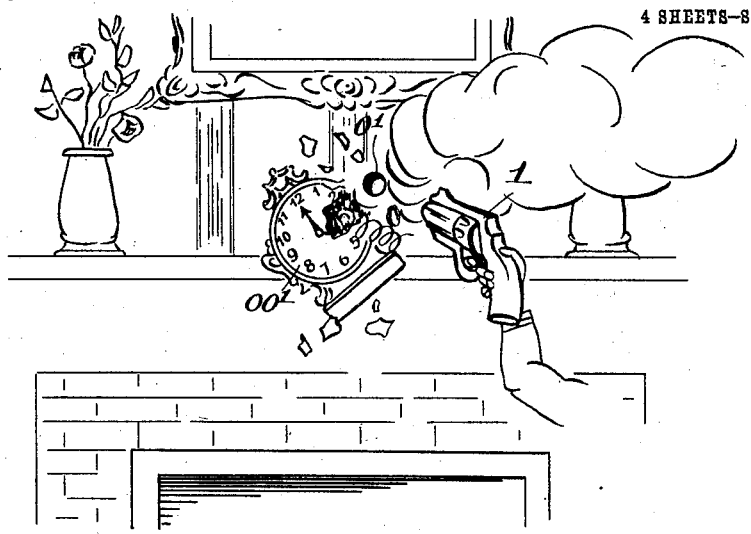
Fig. 2,
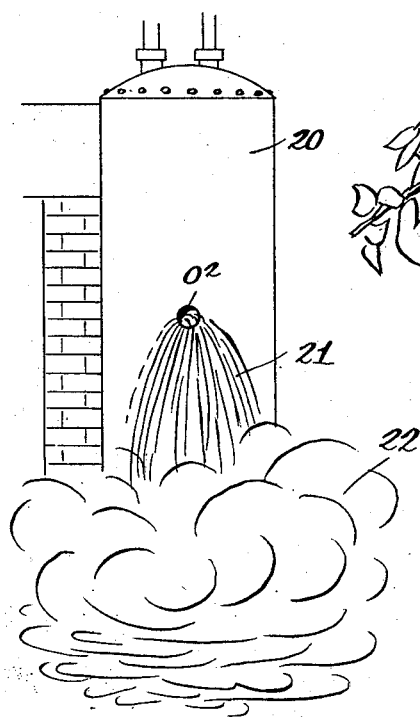
Fig. 3,
Fig. 4,
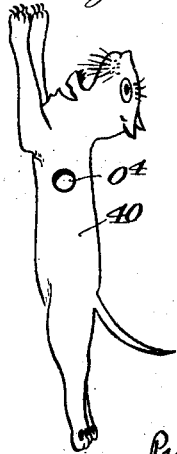
Fig. 5.
Witnesses
Max B. A. Doring
Anna Buchner
Inventor
Peter S. H. Newell
By his Attorney Augustus T. Pemlitz

P. S. H. NEWELL.
BOOK.
APPLICATION FILED APR. 17, 1909.

1,028,130.

Patented June 4, 1912.
4 SHEETS—SHEET 2.

Witnesses
Max P. A. Doring.
Anna Buchner.

Inventor
Peter S. H. Newell
By his Attorney Augustus T. Gurlitz

P. S. H. NEWELL.
BOOK.
APPLICATION FILED APR. 17, 1909.

1,028,130.

Patented June 4, 1912.

4 SHEETS—SHEET 3.

Witnesses:

Inventor
Peter S. H. Newell
By his Attorney

COLUMBIA PLANOGRAPH CO., WASHINGTON, D. C.

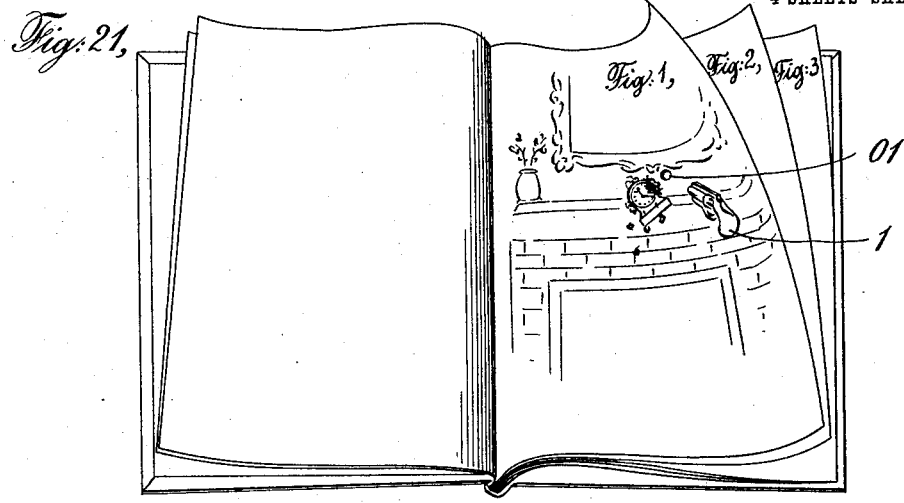

UNITED STATES PATENT OFFICE.

PETER S. H. NEWELL, OF LEONIA, NEW JERSEY.

BOOK.

1,028,130.   Specification of Letters Patent.   Patented June 4, 1912.

Application filed April 17, 1909. Serial No. 490,629.

*To all whom it may concern:*

Be it known that I, PETER S. H. NEWELL, a citizen of the United States, residing at Leonia, in the county of Bergen and State of New Jersey, have invented certain new and useful Improvements in Books, of which the following is a specification, reference being had to the accompanying drawings, which form part of the same.

The present invention relates in general to books, and has for its primary object to provide a picture book which embodies novel features of construction whereby a new and pleasing effect is obtained as the various pages of the book are turned.

In the drawings several examples of my invention are shown.

Figure 7:
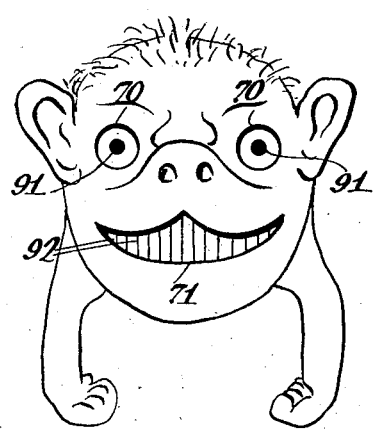
Figure 8:
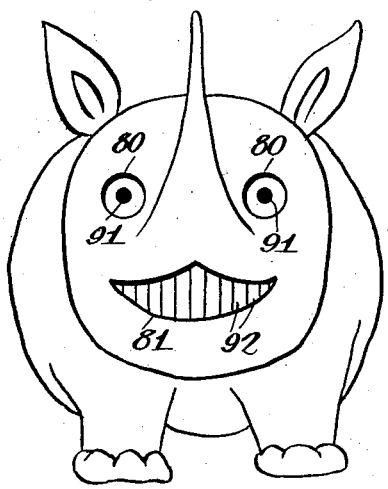
Figure 9:
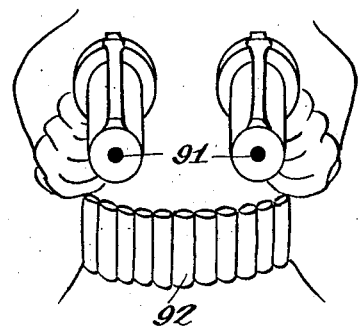
Figure 19:
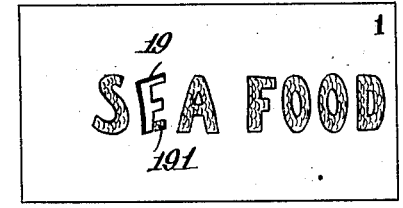
Figure 20:

Figure 1 is a portion of a picture or pictorial representation, which may show or indicate a portion of the first page of a book containing an example of my invention. Fig. 2 is a view in which is shown a design that may be employed in carrying forward the example of my invention shown in Fig. 1. Fig. 3 is a portion of another view of a similar character. Fig. 4 is a portion of still another view of a similar character. Fig. 5 is a portion of still another view of a similar character. Fig. 6 is a view of what may be a portion of the pictorial illustration on the first page of another example of my invention. Fig. 7 is a view showing a portion of a design which may be employed in carrying forward the example of my invention shown in Fig. 6. Fig. 8 is a portion of another view of a similar character. Fig. 9 is a portion of the view which may conclude the series in the example of my invention shown in Fig. 6. Figs. 10 to 14 illustrate an example of my invention as it may be applied and worked out for commercial purposes. Figs. 15 to 19 illustrate another example of my invention similarly applied. Fig. 20 is a view showing the leaves of Figs. 14, 13, 12, 11, and 10, arranged in present-day conventional book form. Fig. 21 is a view showing the leaves of Figs. 1, 2, 3, etc., arranged in present-day conventional book form.

In carrying out my invention a characteristic word, numeral or pictorial representation is designed and displayed in any desired manner, as for example, the representation shown in Fig. 1. The portions which are material in order to disclose my invention, are the pistol, 1, which is being discharged, and which in this example of the invention suggests or shows the cause of the various perforations, if it is desired to show such a cause, that not always being necessary however, in carrying out my invention; but a series of perforations made or suggested to be made by some well known cause, may often be employed to add interest to some of the designs. Thus by a story or by verses the track, etc., of the cause of the perforations may be described, to accompany the designs or delineations. In the example of my invention as applied to a series of designs starting with a sheet containing the design of Fig. 1, the supposed bullet smashes the clock $OO^1$ shown in Fig. 1, and cuts a round perforation, $O^1$, in the wall or partition back of the place where the clock $OO^1$ stood. Passing into another apartment, suggested in the sheet containing Fig. 2, such bullet cuts a perforation $O^2$ through a hot water boiler, 20, thereby allowing the hot water, 21, to escape therefrom, and the steam 22, to arise. Continuing its course, such bullet is supposed to cut through a fruit laden bough, 30, in the sheet of Fig. 3, by means of the perforation, $O^3$; continuing its course, such bullet is supposed to pass through an animal 40, just about to spring, by means of the perforation, $O^4$, as on the sheet containing Fig. 4; continuing its course such bullet is supposed to pass through a stove pipe 50, by the perforation, $O^5$, allowing the smoke, 51, to escape therefrom, as shown on the sheet containing Fig. 5. It is to be understood, of course, that the designs or delineations shown in the Figs. 1 to 5, represent only so much or such portions of the design on each of such sheets as are sufficient to show the invention intended to be secured, and that each of such designs or delineations may be elaborated and added to in any way desired. The several designs are to be so drawn and spaced on their respective sheets, that the particular portion, of each delineation, in which the perforation is to appear, shall be directly back of the perforation in the preceding design, so that, for example, when the series represented by Figs. 1 to 5 are attached to each other and bound up into book form, the perforation $O^5$, will be directly back of $O^4$; that directly back of $O^3$; that directly back of $O^2$; and that directly back of $O^1$, the same rule being followed whether there are more or less than five of such separate sheets of designs or delineations. In the series shown in Figs. 1 to 5, therefore, Fig. 1 would be the first page or sheet of the book or series, and would be followed in their order by the sheets bearing the designs, respectively marked Figs. 2, 3, 4, and 5.

Figs. 6, 7, 8 and 9 represent portions of pictorial illustrations showing another example of my invention. In this example of my invention, Fig. 6 is shown as the first sheet or leaf of the series, Fig. 7, is the second sheet or leaf; Fig. 8 is the third, and Fig. 9 is the fourth and last sheet of the series; enough of the design or delineation on each sheet is shown, to clearly indicate the application of my invention thereto. The several designs Figs. 7, 8, and 9, are to be so spaced with reference to the perforations that when they are placed or bound together, the perforations 80, 80 representing the eyes in Fig. 8, which is a conventional picture of a rhinoceros, will be spaced to register with the perforations 70, 70 representing the eyes of Fig. 7, which is a conventional picture of a gorilla, and these in turn will likewise be spaced to register with the eyes 60, 60 of Fig. 6, which is a conventional head of a lion. The same rule applies to the perforations 81, 71, and 61, each of which represents the open mouth in each of the figures mentioned. Fig. 9, on the other hand will have the bores 99, 91 of the conventional revolver shown in that figure so spaced that the bores, 91, 91, will be in the center of the muzzle of such revolver, and register in such manner as to form the pupils 91, 91, in the eye perforations 60, 70, and 80, in Figs. 8, 7, and 6, and the cartridge belt 92, of Fig. 9, will be so spaced on that figure that it will coincide with, and show through the mouth openings 61, 71, and 81, respectively of Figs. 6, 7, and 8. When the leaves or sheets containing Figs. 6, 7, 8 and 9 respectively are placed or bound together back of each other, the pupils 91, 91, will appear, as in Fig. 6 of the drawing, but when the sheet with Fig. 6 is "opened" that is, turned back as in opening a book, then the eye only of the perforation 60, will be visible. The case will be the same with the sheets of Figs. 7 and 8; that is to say, when as a book, sheets 7 and 8 rest upon Figs. 9, the pupils 91, 91, will be seen in the eye perforations 70, 70, and 80, 80, but when these leaves or sheets are respectively "opened" the perforations 70, 70, and 80, 80 only will be seen, but the pupils 91, 91, will not be seen. So with the perforations 61, 71, and 81 forming the mouth openings, in the sheets of Figs. 6, 7, and 8. When the leaves of the book are closed, the cartridge belt, 92, will appear and represent the teeth in the mouth of each, as shown in the drawings Figs. 6, 7, and 8, but as the leaves are opened, one by one, as in a book, only the mouth perforation 61, 71, and 81, will be seen as each of such leaves is turned back or opened. In other words, the drawings, 6, 7, and 8 show the designs as they appear when the book is closed while the drawing, 9, shows the design as it would appear when the sheets of drawings 6, 7, and 8 are open, or turned back from 9.

Of course it is to be understood that only enough of designs has been shown to make the invention clearly understood, and that on each page containing one of the perforated representations, elaborate and detailed pictures in addition may be shown, and as many pages as may be desired may be worked out for any of the series, and they may be either plain or in colors, or partly plain and partly in colors.

In addition to the pictorial illustrations shown in the drawings, literary matter may also be inscribed upon the leaves of the book, or upon some of them, relating to the pictures, or otherwise, as may be desired.

Figure 10:
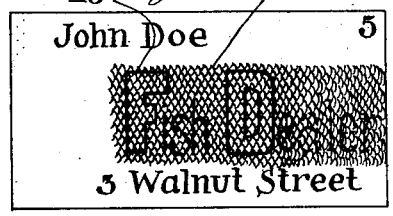
Figure 15:
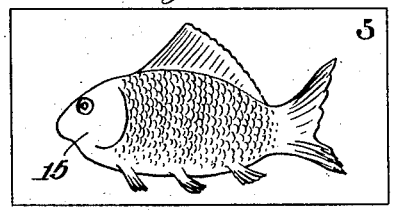
Figure 11:
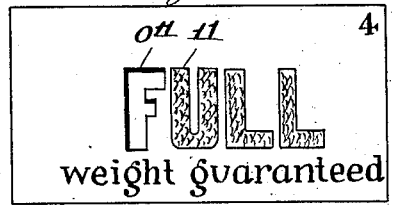
Figure 12:
Figure 13:
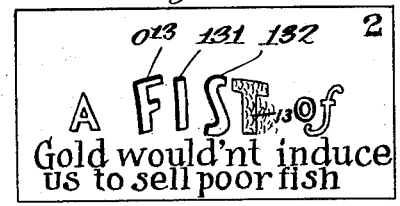
Figure 18:
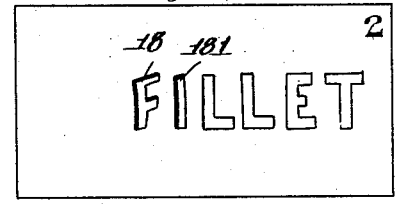

In Figs. 10 to 14 is shown an example of my invention, as it may be applied to commercial as distinguished from literary productions. In this example of my invention, Fig. 10 is represented as the last leaf of the book or series. This leaf may be entirely covered with a net-like design, $O^{10}$, drawn so that it will closely resemble the scales of a fish, and at the same time any suitable reading matter may be displayed on or as a part of such net work, as for instance the words "Fish dealer" as in part indicated by the lettering, and the name of the dealer above, and his address below such words. As contemplated in this example of the invention however, there is to be nothing but the net like scale part within the portion included in the part 10, which is within the outline of the letter F. The next leaf, Fig. 11, has a perforation or cut out part $O^{11}$, in the form of a letter F, followed by the letter U, which is not cut out, but is printed or otherwise delineated on this sheet or leaf. When the leaf, Fig. 11, lies on the leaf, Fig. 10, the part 10, of Fig. 10, will show through the cut out part $O^{11}$ of Fig. 11, so that the letters F U in Fig. 11, will present substantially similar characteristics. The letter U may be followed by the letters L L on the same leaf, similarly delineated, to form the word "Full," under which may be printed the words "Weight guaranteed," if desired. The next leaf, Fig. 12, will have cut out portion $O^{12}$, in the form of the letter F, and cut out portion 121, in the form of letter I, the cut out portion F, disposed to register with the part 10 of Fig. 10, and with the part $O^{11}$ of Fig. 11; and the cut out part I, disposed to register with the upright, 11, of Fig. 11, so that the scale like parts of Figs. 10 and 11 will show through the cut out parts $O^{12}$, and 121, forming the letters F I in Fig. 12. Following these letters on the sheet, Fig. 12, will be delineated the letter N, as shown in the drawing, and there may also be delineated next to it the letter E, so as to form the word "Fine," and under the line formed by this word "Fine," there may be delineated the words "Fish is our specialty," so that the legend "Fine fish is our specialty" would appear on this leaf or page. The next leaf or sheet of this series is Fig. 13, on which are cut out the perforations $O^{13}$, 131, 132, in the forms of the letters F I S and following the cut out letter S there may be delineated on this leaf the letter T, so as to form the word "Fist," which may form part of the legend "A fist of gold would not induce us to sell a poor fish" by additional lettering or printing on the same sheet. The registering of the cut-out letters is to be such that $O^{13}$, F, would register with $O^{12}$, $O^{11}$, and 10; 131, I, would register with 121, and 11; and S 132, would register with the upright 12 of the N in Fig. 12, by reason of which the scale like parts would appear through the cut out letters I, 131, and 132. The next leaf or sheet of this series is Fig. 14, which would be the first leaf of the series. On that there is the delineation of a fish, 14, and cut out letters or perforations F, $O^{14}$; I, 141; S, 142, and H, 143. These cut out parts or letters, "Fish," are to be cut out so that the letter F, $O^{14}$, will register with F, $O^{13}$, in Fig. 13, and with F, $O^{12}$ in Fig. 12, and with F, $O^{11}$, in Fig. 11, and with F, 10, in Fig. 10; so that the letter I, 141 will register with I, 131 in Fig. 13, with I, 121, in Fig. 12, and with the upright 11, of the letter U in Fig. 11; so that the letter S, 142, will register with the letter S, 132, of Fig. 13, and with the upright 12, of the letter N in Fig. 12; and so that the letter H, 143, will register with the letter T, 13, in Fig. 13. It will be noted that by the side of the letter T, 13, in Fig. 13, there are some scale like markings, these are designed to show through the cut out part of the letter H, 143, of Fig. 14, for the reason that the upright of the letter T, 13, of Fig. 13, is not quite wide enough to present a scale-like part back of the letter H, 143, when the leaf 14, lies flat on the leaf 13.

Figure 14:
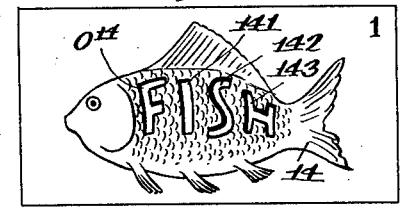

It will be understood from this description and the drawings, that when the leaves 10, 11, 12, 13, and 14, are arranged in book form and closed, as shown in Fig. 20, which shows the leaves of figures 10, 11, 12, 13, and 14, fastened together in the form of a modern conventional book, the first page, Fig. 14, will represent or show a fish, the scale-like parts of Figs. 13, 12, 11, and 10, showing through the cut out letters $O^{14}$, 141, 142, and 143; and obscuring these cut-out letters, but when the leaf, 14, is "opened" or turned back, like the leaf of a book, the first leaf will look as it is shown in Fig. 14; that when the next leaf, Fig. 13, is closed the scale-like parts herein described, on the pages or leaves 12, 11, and 10, will appear through the cut out letters, $O^{13}$, 131, 132, but when the leaf 13 is turned back or "opened" it will appear as in Fig. 13, so far as the cut-out letters are concerned; that when the leaf Fig. 12 is closed, the scale-like parts on leaves 11 and 10 will appear through the cut out parts $O^{12}$, 121, but when the leaf Fig. 12, is "opened" it will appear as in Fig. 12, so far as the cut-out parts are concerned; and that when the leaf, Fig. 11, is closed, the scale-like parts 10, of Fig. 10, will appear through the cut-out part, F, $O^{11}$, but that when the leaf Fig. 11, is opened, it will appear as in Fig. 11, so far as the cut out part is concerned.

In the example of my invention shown in Figs. 15, 16, 17, 18 and 19 the perforations are arranged in a reverse order from that shown in Figs. 10 to 14. In this example of my invention the last leaf, Fig. 15, may represent a design of a fish with name of dealer above the fish, and the word "Dealer" beneath the fish. On the next leaf, 16, the letters forming the word "Fish," that is 16, 161, 162, and 163, are cut out, the result being that when the leaf 16 is closed down on the leaf 15, the scales of the fish, 15, will appear through the cut out parts designated. Suitable reading matter may be arranged on leaf 16, in connection with the word "Fish," for example the word "All" may be inscribed or printed above the word "Fish," and the words "Is good brain food" beneath the word "Fish."

Figure 16:
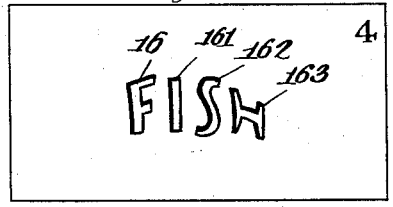
Figure 17:
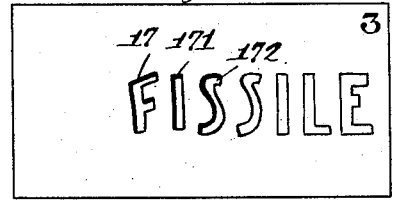

On the leaf Fig. 17, the letters F I S, that is 17, 171, and 172, are cut out, and so that these letters will register with the letters 16, 161, and 162, of Fig. 16, and through the cut out parts, the scales of the fish, 15, will be seen, when the leaves 17 and 16, are closed down on the leaf 15. If desired other letters may be inscribed upon leaf 17, with the letters F I S, for example, those letters might form part of the legend "Fissile shad nicely planked." On the next leaf, Fig. 18, the letters F I, 18, 181, are cut out, to register with 17, 171, of Fig. 17, and with 16, 161 of Fig. 16, so that the scales of the fish, 15, would appear through these cut out letters when the leaves 18, 17, and 16, are closed down on leaf 15. These letters 18, and 181, may form a part of a legend delineated on sheet 18, for example, part of the legend, "For breakfast, fillet or flounder." On the next leaf, Fig. 19, the letter F, 19, is cut out to register with F 18, F 17, and F 16, in Figs. 18, 17 and 16 respectively, so that the scales of the fish, 15, of Fig. 15, would be seen through the cut-out part, when all the leaves are closed down on Fig. 15. The cut out letter F, 19, is shown formed with a delineation of a scaly part 191, in Fig. 19, showing how it may be turned into the letter E on sheet or leaf, Fig. 19, which in this example of my invention is the first leaf of the series, and it may be used as the E part of the words "Sea food," the other letters of those words being delineated, printed, or inscribed upon that leaf. It will thus be seen that when the leaves 16, 17, 18, and 19, are closed down on the leaf 15, the scales of the fish, 15, will be seen through each of the cut out letters of all the other leaves, that is to say through the cut out letters 16, 161, 162, 163, Fig. 16; 17, 171 and 172, Fig. 17; 18 and 181, Fig. 18, and 19 of Fig. 19, but that when these leaves are opened, each when opened will disclose only the perforated or cut out parts as shown in the drawings, together with any matter however which may be inscribed or delineated on each leaf, as herein suggested.

It will be observed that by gradually decreasing the sizes of the cut out letters from sheet to sheet as indicated in Figs. 11 to 14, the registering of the letters upon each other is rendered less troublesome than it would be if all of the cut out letters were to be of the same size exactly.

It is to be understood that each one of the figures 1, 2, 3, 4, 5, etc., is to be on a separate sheet, and that each one is to constitute one page or leaf of the book, as shown in Fig. 21, which shows a conventional modern form of book, containing the leaves having upon them figures 1, 2, 3, etc., of the drawing.

In Fig. 20 an advertising book or booklet is shown as one example of the way my invention may be applied for commercial purposes; in Fig. 21 a pictorial book is shown, the first illustrated page of which may be that partly shown in Fig. 1 of the drawings, the next page may be that in part shown in Fig. 2, the next page may be that in part shown in Fig. 3, etc., and such book may contain any desired number of pictorial illustrations. Of course, it is to be understood that the design of Fig. 2 is so arranged that the perforations $O^2$ of that figure shall register with the perforations $O^1$ of the leaf containing Fig. 1, and that the perforation $O^3$ in Fig. 3 shall likewise register with the perforations $O^1$, and $O^2$, and the same is true of all the leaves having the designs or illustrations to be included in such book, except the last leaf of the series, which may, if desired, contain a picture or delineation on which the suggested means of making the perforations, in this instance the bullet, may be shown in any desired configuration.

These examples of my invention indicate that it may be applied to a great many purposes, and may be worked out in numberless ways with pictorial or decorative additions according to the taste or desires of the persons applying the same to books of various kinds, and I do not limit myself to any particular kind of book, or to any form or manner of employing the same, but

Having thus described my invention, what I claim as new, and desire to secure by Letters Patent, is—

1. A book comprising a series of sheets each of which has a design thereon and is provided with a perforation which forms a part of the said design, the perforations of the various sheets being of substantially the same size and registering with each other when the book is closed.

2. A book comprising a series of sheets each of which has a design thereon and is provided with a perforation which forms a part of the said design, the perforations of the various sheets being of substantially the same size and registering with each other when the book is closed, and a sheet arranged beneath said series of sheets so as to extend across the perforations therein, the said sheet having a design thereon.

3. A display device comprising a series of superposed sheets each of which has a design thereon, the different sheets having different numbers of perforations therein and the corresponding perforations in the different sheets being in alinement with each other so that the portions of the designs upon the underlying sheets showing through the perforations in any one of the sheets will form a part of the design on the said sheet.

4. A display device comprising a number of superposed sheets each of which has a design thereon, all of the said sheets except the bottom sheet having a perforation therein and each succeeding sheet from the bottom having one more perforation than the sheet below, the corresponding perforations in the various sheets being in registry with each other so that the portions of the designs upon the underlying sheets showing through the perforations in any one of the sheets will form a part of the design on the said sheet.

5. As a new article of manufacture, a book comprising a series of leaves, each having an independent design or delineation, and a perforation forming part of said design, said perforations being substantially of the same shape and nearly equal size, and registering with each other when the book is closed, substantially as described.

PETER S. H. NEWELL.

Witnesses:
 ANNA BUCHNER,
 LAWRENCE S. COIT.

Copies of this patent may be obtained for five cents each, by addressing the "Commissioner of Patents, Washington, D. C."